United States Patent

[11] 3,609,571

[72] Inventors Gerald Ira Klein
Westbury, N.Y.;
Robert L. Zahm, Annapolis, Md.

[21] Appl. No. 869,526
[22] Filed Oct. 27, 1969
[45] Patented Sept. 28, 1971
[73] Assignee The United States of America as represented by the Secretary of the Navy

[54] SIDEBAND SUPPRESSION FOR BROADBAND PARAMETRIC AMPLIFIER
6 Claims, 4 Drawing Figs.

[52] U.S. Cl. .......... 330/4.9, 330/56
[51] Int. Cl. .......... H03f 7/04
[50] Field of Search .......... 330/4.9; 307/88.3

[56] References Cited
UNITED STATES PATENTS

| | | | |
|---|---|---|---|
| 3,169,227 | 2/1965 | Closson | 330/4.9 |
| 3,230,464 | 1/1966 | Grace | 330/4.9 |
| 3,259,847 | 7/1966 | Vilcans | 330/4.9 |

*Primary Examiner*—Roy Lake
*Assistant Examiner*—Darwin R. Hostetter
*Attorneys*—Edgar J. Brower and Henry Hansen

ABSTRACT: A broadband microwave parametric amplifier utilizing a resonant slot low Q filter in the pump line that creates a short circuit at all frequencies other than the pump frequency. This makes the amplifier performance completely independent of pump line source impedance.

INVENTORS
GERALD I. KLEIN
ROBERT L. ZAHN
BY
[signature]
ATTORNEY

SIDEBAND SUPPRESSION FOR BROADBAND PARAMETRIC AMPLIFIER

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The invention generally relates to microwave signal processing, and, more particularly to microwave amplifiers.

The invention has application to semiconductor parametric amplifiers operating on the basis of periodically varying the capacitance of a varactor diode by means of a high-frequency source (called the pump) and transferring energy to a lower frequency input signal by the mixing of the input frequency with the pump frequency and the difference frequency or idler frequency.

The Manley-Rowe relations show that current must flow at the three frequencies satisfying the relation:

$$f_{pump}=f_{signal}+f_{idler}$$

for gain to exist at the signal frequency. Provisions must therefore be made to present a short circuit or very low impedance to the diode terminals at the idler frequency to allow current to flow at this frequency without introducing excessive losses. In addition, it is desirable that an open circuit appears to the diode terminals to prevent current flow at unwanted frequencies within the parametric amplifier. These frequencies include the second and higher harmonics of the pump, signal and idler frequencies and the upper sideband or sum frequencies of the pump and the signal.

Some previously known parametric amplifiers employ tuners in the pump input line for impedance matching at the pump frequency in order to couple in maximum pump power and for presenting a high impedance, in the pump line, to the diode terminals, at all other frequencies. Experience has shown that such an arrangement is satisfactory for a narrow band parametric amplifier where the input signal may have a bandwidth up to 50 mHz. However, this arrangement is not satisfactory in a wideband amplifier where the input frequency may vary over a bandwidth as wide as 500 mHz. This previously known amplifier may be initially tuned to provide the desired broad frequency response without the exitation of spurious frequencies over the input frequency range. However, small changes in the phase or magnitude of the impedance of the pump line inhibits the ability to sufficiently attenuate the generated upper sidebands of the pump and input signal over portions of the input frequency range with consequential large fluctuations of the gain over the frequency range.

Since the upper sideband frequency is normally much higher than the passband of the waveguide, the impedances presented by the external components, such as the attenuator and waveguide, are unpredictable. If the upper sideband were allowed to reach these components for the reflection, reflections would be unpredictable; and, as a result, the amplifier frequency response would be unpredictable.

SUMMARY OF THE INVENTION

A general purpose of the invention is to provide for the short circuiting of all frequencies in the pump line other than the pump frequency in order to keep the upper sideband of the pump and input signals and other spurious frequencies from reaching the pump source and in order to prevent the external components on the pump input side from affecting the frequency response of the amplifier. Suppression of the upper sideband signal and other undesirable spurious signals in the pump line improves the amplification of the input signal over a wide frequency range.

Briefly, the general purpose and other objects of the invention are accomplished by the use of a resonant slot low Q filter in the pump line to short circuit undesirable frequencies. This form of filter has a well-defined electrical shorting plane at frequencies out of its passband. A slot with a low Q on the order of 3 to 6 can be achieved with reasonable slot dimensions, and this is adequate to separate the pump frequency from the upper sideband and other possible spurious signal frequencies. A double-screw tuner placed between the resonant slot and the varactor diodes is used to adjust the impedance at the diode terminals for suppressing the upper sideband in this contained area. A second double-screw tuner placed on the other side of the resonant slot is utilized for impedance matching the pump source to the varactor diodes to provide maximum power transfer.

DESCRIPTION OF THE PREFERRED EMBODIMENT

Figures 1, 2, 3, 4:
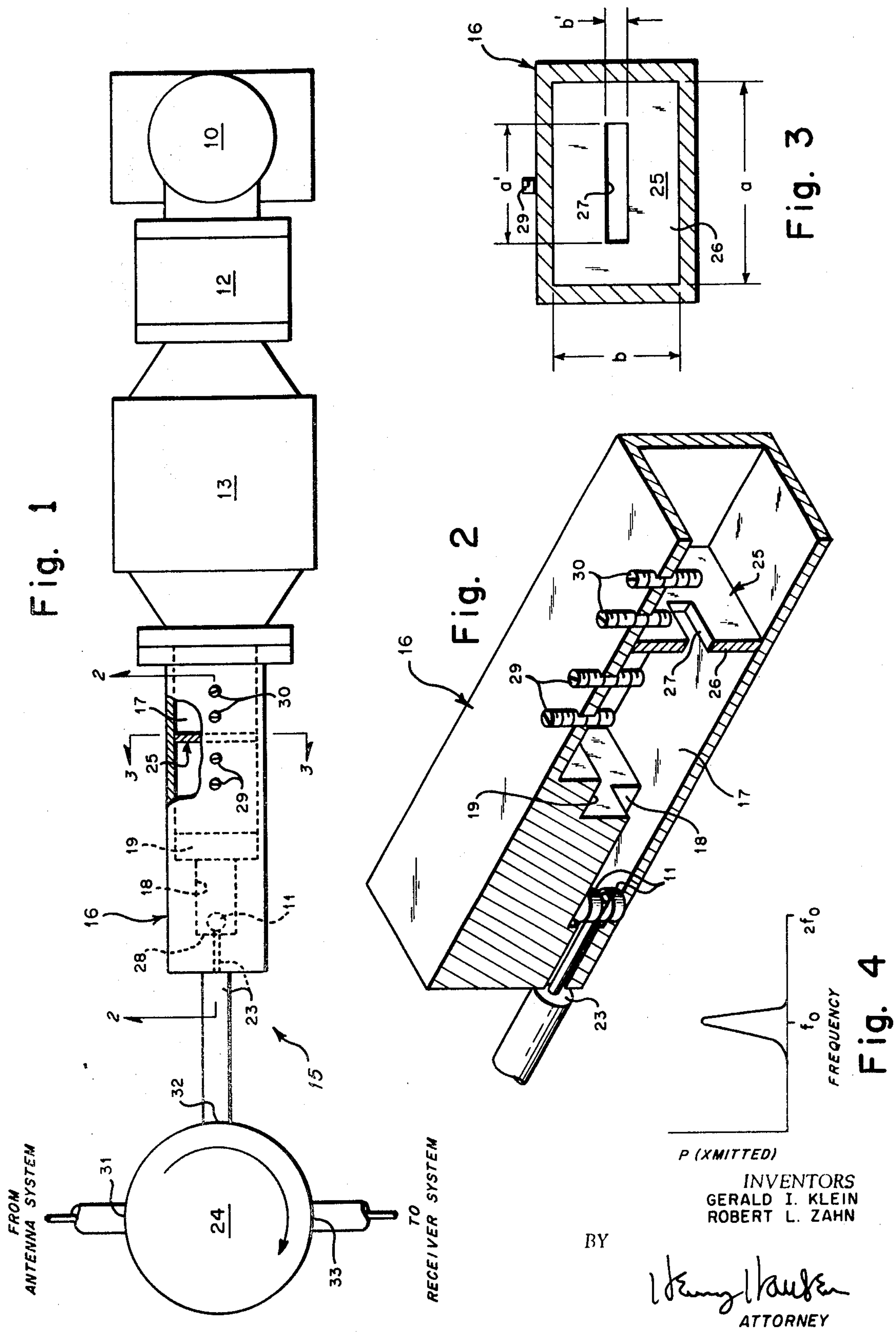
FIG. 1 represents a view of a parametric amplifier arrangement of the present invention with portions broken away.
FIG. 2 represents an isometric view of a cross section taken generally along the line 2—2 of FIG. 1.
FIG. 3 represents a view in cross section taken generally along line 3—3 of FIG. 1.
FIG. 4 illustrates the response of a resonant-slot filter in the amplifier of FIG. 1.

Referring to FIG. 1, an X-band input signal to be amplified is transmitted from an antenna system (not shown) to a first port 31 of a circulator 24 which guides the input signal to a second port 32 for transmitting the input signal along a coaxial input-output line 23 to varactor diodes 11 in a parametric amplifier, generally designated 15. An amplified signal is then sent from the varactor diodes 11 via the same coaxial input-output line 23 back to the same second port 32 of circulator 24, and then guided to a third port 33 of circulator 24, from which it is conducted to a receiver system (not shown).

The above-indicated parametric amplifier 15 operates basically as a single port device wherein the X-band input signal and the amplified signal to the receiver both pass through the same second port 32 of the circulator 24.

A second signal is generated by a Klystron K-band pump source 10, shown in FIG. 1. The pump source 10 generally provides a K-band pumping signal to the two varactor diodes 11, in parametric amplifier housing 16 for varying the capacitance of the varactor diodes 11. The interaction of the X-band input signal and the K-band pumping signal transfers power to the X-band input signal and creates among other signals a Ku-band idler frequency which is necessary for the operation of the device. This idler frequency is the difference frequency of the frequencies of the pumping signal and the input signal.

The transmission of the K-band pump signal from the pump source 10 to the varactor diodes 11 is accomplished as best shown in FIG. 1. The pump source 10 is connected to one end of a typical isolator 12. The isolator 12 at its other end connects to a K-band waveguide variable attenuator 13 which in turn connects to a parametric amplifier housing generally designated 16.

The parametric amplifier housing 16 more clearly shown in FIG. 2 has a full size K-band waveguide 17 connected to one end of a reduced size waveguide 18 of reduced height and width, by means of a step transformer 19. If full size waveguide 17 is connected directly to the reduced size waveguide 18, a very high-voltage standing wave ratio (VSWR) will result. Matching the full size guide 17 to the reduced size guide 18 in transformer steps 19 reduces this VSWR. These transformer steps 19 are located at the interface of the reduced size waveguide 18 and the full size waveguide 17 as is more clearly shown in FIG. 2.

The varactor diodes 11 have their collectors electrically and mechanically connected within the reduced size waveguide 18 to its upper and lower walls. An endwall 28 terminates the reduced size waveguide forming a cavity for the pump, input and idler frequencies. The two varactor diodes 11 have their emitters connected to the inner conductor of the coaxial transmission input-output line 23.

Inside the parametric amplifier housing 16 is a pump frequency resonant-slot filter 25 connected orthogonally to the walls of the full size waveguide 17 as shown in FIGS. 1 and 2. The resonant-slot slot filter 25 comprises a wall 26 having a slot 27 formed therethrough as shown in FIG. 3. The wall 26 of the resonant-slot filter 25 can be made of any convenient low resistance material such as aluminum, copper or brass with suitable plating such as gold where environmental protection is required. The exact placement of the resonant slot filter 25 in the full size waveguide is not critical. The formula for the approximate dimensions of the resonant-slot filter 25 as shown in FIG. 3 is as follows:

$$\frac{a}{b}\sqrt{1-\left(\frac{\lambda}{2a}\right)^2}=\frac{a'}{b'}\sqrt{1-\left(\frac{\lambda}{2a'}\right)^2}$$

wherein $\lambda$= wavelength of pump signal
$a$ = waveguide width
$b$ = waveguide height
$a'$= slot width
$b'$= slot height Using a full size K-band waveguide 17 that is 0.170 inch high by 0.420 inch wide, the slot height will normally be about 0.015 inches and the slot width will be about 0.270 inch.

The thickness of the filter is a compromise between the Q and the ease of producibility. Increasing the thickness will increase the Q, but will also make machining of the slot more difficult and costly. The filter will normally be approximately 0.012-inch thick for the K-band. Decreasing the slot height yields a higher Q, however, this is limited by the practical consideration of being able to machine the slot. A low Q in the order of 3 to 6 is readily obtainable. The band pass characteristics of the resonant slot 25 in terms of transmitted power is shown in FIG. 4 wherein $f_0$ designates the pump frequency.

Double stub tuning screws 29 are connected to the full size waveguide 17 on the varactor diode 11 side of the slot filter 25. The tuning screws 29 are used to adjust the impedance at the diode terminals 11 to suppress the upper sideband. A second double-screw tuner 30 is connected to the full size waveguide 17 on the pump 10 side of the slot filter 25. Tuning screws 30 are used to match the pump source to the varactor diodes 11 for maximum power transfer. There is no need for suppression of the upper sidebands or other spurious signals by the tuning screws 30 as all such signals in that portion of the pump line are effectively eliminated by resonant-slot filter 25. The approximate positions of the double-tuning screws 29 and 30 are shown in FIGS. 1 and 2. These are adjusted empirically for best results.

It has been found that the above-described parametric amplifier system by use of a resonant-slot low Q filter 25 in the pump line makes the amplifier performance completely independent of any pump line source impedance that could affect the upper sideband or other spurious frequencies. This prevents small changes in the phase or magnitude of the impedance on the pump 10 side of the resonant-slot 25 from generating upper sideband frequencies over portions of the input frequency range with consequent large fluctuations of gain over the frequency range. This unique interrelationship of part has been found to give a constant output in a wideband amplifier.

Obviously many modifications and variations of the present invention are possible in the light of the above teachings. It is therefore to be understood that within the scope of the appended claims the invention may be practiced otherwise than as specifically described.

1. A broadband parametric amplifier system comprising:
waveguide means forming two sections of different transverse areas connected at their proximal ends by a step transformer, the distal end of one section formed to receive a pumping signal of predetermined frequency;
a variable impedance device mounted in the other section of said waveguide means; waveguide means for transmitting a pumping signal of a second
first tuning screw means mounted in said one section along the path of the pumping signal and extending into said waveguide means for providing maximum power transfer;
a slot filter mounted in said one section between said first tuning screw means and said transformer and formed to be resonant at the predetermined frequency of the pumping signal;
second tuning screw means mounted in said one section between said slot filter and said transformer and extending into said waveguide means for suppressing upper sideband signals; and
input and output means operatively connected to said variable impedance device for transferring input and output signals respectively to and from said variable impedance device.

2. A broadband parametric amplifier system as recited in claim 1, wherein:
said slot filter being made of a conductive material and having a Q in the range of 3–6.

3. A broadband parametric amplifier system as in claim 2 wherein said input and output means is a circulator.

4. A broadband parametric amplifier as in claim 3 wherein each of said first and second tuning screw means include plural adjustable screws.

5. A broadband parametric amplifier system comprising:
pump means for generating a K-band pumping signal;
isolator means connected to said pump means for providing isolation for said pump means;
attenuator means connected to said isolator means for providing pumping signal attenuation;
a first waveguide of predetermined transverse area connected to said attenuator means for conducting said K-band pumping signal;
a step transformer connected to said first size waveguide for reducing a voltage standing wave ratio;
a second waveguide of predetermined transverse area lesser than said first waveguide connected to said step transformer;
first double-tuning screws mounted in said first waveguide along the path of the pumping signal and adjustable extending into said first waveguide for providing maximum power transfer;
a conductive material slot filter having a Q between 3 and 6 mounted within said first waveguide between said first double-tuning screws and said transformer and formed to be resonant at said pumping signal frequency;
second double-tuning screws mounted in said first waveguide between said slot filter and said transformer and adjustable extending into said first waveguide for suppressing upper sideband signals;
variable impedance means including a pair of varactor diodes connected to the inner walls of said second size waveguide for receiving both an X-band input signal and said K-band pump signal forming a Ku-band idler frequency and transmitting an amplified X-band signal as an output signal; and
input and output means operatively connected to said variable impedance device for transferring input and output signals respectively to and from said variable impedance device.

6. A broadband parametric amplifier system according to claim 8 wherein said input and output means further includes a three-port circulator comprising:
a first port connected for receiving said X-band input signal;
a second port operatively connected to said first port and to said variable impedance device for both transmitting said X-band input signal and receiving said X-band output signal; and
a third port operatively connected to said second port for guiding said X-band output signal to said output means.